Jan. 26, 1932.   U. A. WHITAKER   1,842,488
BRAKE CYLINDER PRESSURE GOVERNOR
Filed Dec. 11, 1929
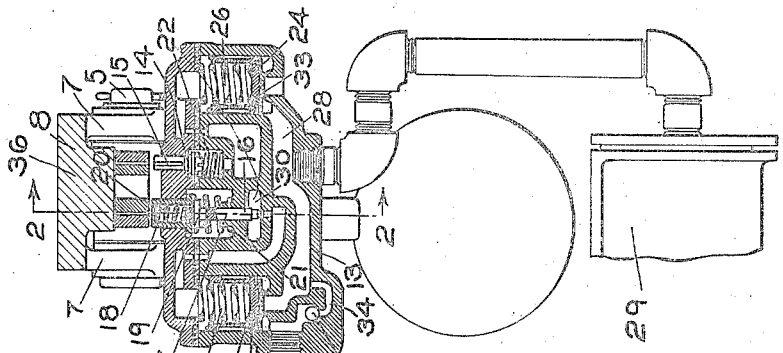
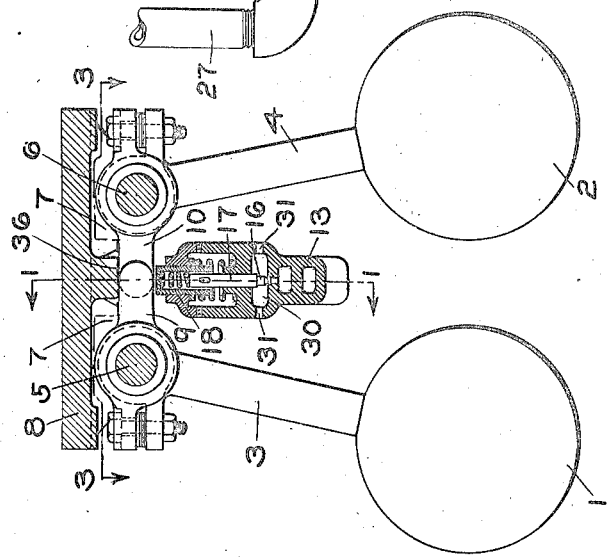
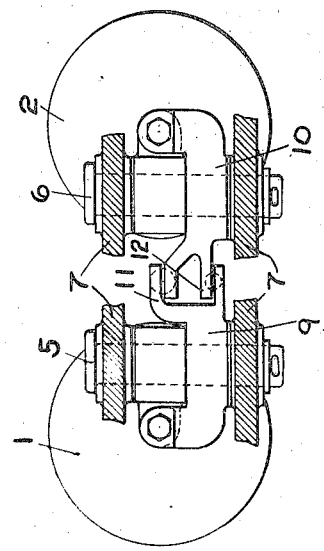
INVENTOR
UNCAS A. WHITAKER
BY *Wm. M. Cady*
ATTORNEY Patented Jan. 26, 1932

1,842,488

UNITED STATES PATENT OFFICE

UNCAS A. WHITAKER, OF CANTON, OHIO, ASSIGNOR TO THE WESTINGHOUSE AIR BRAKE COMPANY, OF WILMERDING, PENNSYLVANIA, A CORPORATION OF PENNSYLVANIA

BRAKE CYLINDER PRESSURE GOVERNOR

Application filed December 11, 1929. Serial No. 413,309.

This invention relates to fluid pressure brakes and has for its principal object to provide means operating when a predetermined rate of retardation is exceeded for limiting the braking power on a vehicle.

If the braking power on a vehicle be such that the rate of retardation exceeds a predetermined degree, dependent upon the weight of the vehicle and the coefficient of friction between the brake shoes and the wheels, the car wheels will slide, which is undesirable for well known reasons.

In the accompanying drawings; Figure 1 is a section on the line 1—1 of Fig. 2 of a brake power controlling mechanism embodying my invention; Fig. 2 a section on the line 2—2 of Fig. 1; and Fig. 3 a section on the line 3—3 of Fig. 2.

As shown in the drawings, weights 1 and 2 carried by arms 3 and 4 are provided, the arms being mounted on pins 5 and 6, mounted in lugs 7, carried by a bracket 8. Also mounted on the pins 5 and 6 are arms 9 and 10, which are angularly adjustable with respect to but movable with the arms 3 and 4.

The arm 9 is provided with a forked end 11, the prongs of which enclose the prongs of a forked end 12 of the arm 10. Mounted below the forked ends 11 and 12 is a valve casing 13 containing a valve 14 having a stem 15 adapted to be engaged by the forked ends 11 and 12 and a valve 16 having a stem 17. A sleeve 18 adapted to be engaged by the forked ends 11 and 12 carries a pin 19 which extends through a lost motion slot in the stem 17.

A coil spring 20 interposed between the end of the stem 17 and the closed end of the sleeve 18 and a coil spring 21 is interposed between a wall of the casing 13 and the sleeve 18. A spring 22 urges the valve 16 to its seat.

Mounted in the casing 13 are valve pistons 23 and 24, subject respectively to the pressures of coil springs 25 and 26. The valve piston 23 controls communication from a pipe 27 to a chamber 28, which chamber is connected to a brake cylinder 29, and valve piston 24 controls communication from chamber 28 to the atmosphere.

The valve 14 is normally seated and the valve 16 is normally held unseated, so that fluid is vented from the spring side of valve piston 23 to chamber 30, which is open to the atmosphere through ports 31.

When the brakes are to be applied, fluid under pressure is supplied to pipe 27 and acts on the area of valve piston 23, outside its seat. The valve piston is then unseated, permitting flow of fluid to chamber 28 and thence to the brake cylinder 29.

If the rate of retardation should exceed a predetermined degree, one or the other of the pendulum weights 1 and 2, according to the direction in which the vehicle is traveling, will swing, and through the arm 9 or 10 will force the sleeve 18 downwardly, permitting the valve 16 to be moved to its seat by the spring 20. The atmospheric vent being thus cut off from the spring side of valve piston 23, the fluid pressure equalizes from the opposite side of the valve piston, through a restricted port 32, to the spring side of the valve piston, so that the fluid pressures on opposite sides of the valve piston equalize, permitting the spring 25 to seat the valve piston and cut off the further supply of fluid to the brake cylinder.

If the predetermined rate of retardation is still exceeded, a further movement of the arm 9 or 10 will cause the stem 15 of the valve 14 to be engaged and the valve thereby unseated, so that fluid previously equalized from chamber 28, through a restricted port 33 in the valve piston 24, to the spring chamber above the valve piston, will be vented to the atmosphere. The fluid pressure acting on the lower area of the valve piston 24 will then act to move the valve piston from its seat, against the pressure of spring 26, so that fluid will be vented from chamber 28 and the brake cylinder 29 to the atmosphere.

The venting of fluid from the brake cylinder continues until the rate of retardation is reduced sufficiently to permit the pendulum weight to move back so as to allow the arm 9 or 10 to release the stem 15 and thereby permit the valve 14 to seat. With the valve 14 seated, fluid equalizes on opposite sides of the valve piston 24, permitting the spring 26 to seat the valve piston, thus cutting off the further venting of fluid from the brake cylinder. If the rate of retardation reduces sufficiently, the pendulum weight will move so as to permit upward movement of sleeve 18, and thereby the valve 16 will be unseated, so that fluid is vented from the spring side of the valve piston 23. The brake cylinder pressure can now be built up by flow of fluid under pressure from pipe 27, by lifting the valve piston 23 from its seat.

In effecting the release of the brakes, fluid initially flows from the brake cylinder past the unseated valve piston 23 to pipe 27, but when the pressure reduces to a certain degree, the valve piston 23 will be moved to its seat by spring 25.

In order to prevent trapping of fluid under pressure in the brake cylinder, by the seating of valve piston 23, a by-pass passage 34 is provided, which connects chamber 28 directly with pipe 27, and which contains a check valve 35 to prevent flow except in the direction to release fluid from the brake cylinder.

The weights 1 and 2 are held at such an angle to the vertical, that a desired predetermined rate of retardation is necessary in order to cause the weight to swing and operate the controlling valves. The weights are maintained in the normal angular position, by the engagement of the arms 9 and 10 with a stop lug 36 carried by the member 8.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

In a fluid pressure brake, the combination with a brake cylinder and a pipe through which fluid under pressure is supplied to the brake cylinder, of valve means for controlling communication from said pipe to the brake cylinder, valve means for controlling the venting of fluid from the brake cylinder, and an inertia device comprising an inertia movable arm operated when the rate of retardation of the vehicle exceeds a predetermined degree for first engaging and operating the valve means for cutting off communication through which fluid is supplied to the brake cylinder and for then engaging and operating the valve means for venting fluid from the brake cylinder.

In testimony whereof I have hereunto set my hand, this 5th day of December, 1929.

UNCAS A. WHITAKER.